(12) United States Patent
Gruner-Nielsen et al.

(10) Patent No.: US 9,366,811 B2
(45) Date of Patent: Jun. 14, 2016

(54) HIGHLY NONLINEAR OPTICAL FIBER WITH IMPROVED SBS THRESHOLD AND MODERATE ATTENUATION

(71) Applicant: OFS Fitel, LLC, Norcross, GA (US)

(72) Inventors: Lars Gruner-Nielsen, Copenhagen (DK); Soren Herstrom, Ballerup (DK); Dan Peter Jakobsen, Copenhagen (DK); Bera Palsdottir, Copenhagen (DK)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/381,910

(22) PCT Filed: Mar. 4, 2013

(86) PCT No.: PCT/US2013/028816
§ 371 (c)(1),
(2) Date: Aug. 28, 2014

(87) PCT Pub. No.: WO2013/131076
PCT Pub. Date: Sep. 6, 2013

(65) Prior Publication Data
US 2015/0016792 A1 Jan. 15, 2015

(51) Int. Cl.
*G02B 6/00* (2006.01)
*G02B 6/028* (2006.01)
(Continued)

(52) U.S. Cl.
CPC ............... *G02B 6/028* (2013.01); *G02F 1/365* (2013.01); *G02B 6/03627* (2013.01); *G02B 2006/12061* (2013.01)

(58) Field of Classification Search
None
See application file for complete search history.

(56) References Cited

U.S. PATENT DOCUMENTS

2006/0045449 A1   3/2006  Varner
2009/0060433 A1*  3/2009  Tadakuma ......... G02B 6/03627
                                                  385/122
(Continued)

FOREIGN PATENT DOCUMENTS

EP   1901096 A2   3/2008
EP   1995632 A1   11/2008

OTHER PUBLICATIONS

European Patent Appln. No. 13755912.6; Extended European Search Report dated Sep. 22, 2015.
(Continued)

*Primary Examiner* — Sung Pak
(74) *Attorney, Agent, or Firm* — Karu Kessler PC

(57) ABSTRACT

A highly nonlinear optical fiber having an improved stimulated Brillouin scattering threshold is provided. The fiber includes a central core region made substantially from silica doped with aluminum, a trench region surrounding the central core region, and a silica cladding surrounding the trench region. The refractive index profile of the fiber is optimized. A refractive index difference of the central core region relative to the cladding ($\Delta n+$) is less than $26\times10^{-3}$, and more preferably at or near $21\times10^{-3}$. A refractive index difference of the trench region relative to the cladding ($\Delta n-$) is less than $-5\times10^{-3}$. The trench region is preferably doped with fluorine. The aluminum doping level of the central core region is preferably less than 14 wt % Al. A fiber doped with aluminum having this refractive index profile exhibits a significantly higher figure of merit ($P_{th}\gamma L_{eff}$) than conventional germanium-doped fibers.

16 Claims, 2 Drawing Sheets

(51) Int. Cl.
  *G02F 1/365* (2006.01)
  *G02B 6/036* (2006.01)
  *G02B 6/12* (2006.01)

(56) References Cited

U.S. PATENT DOCUMENTS

2009/0196619 A1* 8/2009 Kim .................. H04B 10/60
                                                    398/92

2009/0257724 A1* 10/2009 Taniguchi .......... G02B 6/02028
                                                    385/122
2010/0183303 A1* 7/2010 Okabe .................. G02F 1/3519
                                                    398/52

OTHER PUBLICATIONS

PCT Appln. No. PCT/US2013/028816; PCT International Search Report and Written Opinion dated May 3, 2013.

* cited by examiner

HIGHLY NONLINEAR OPTICAL FIBER WITH IMPROVED SBS THRESHOLD AND MODERATE ATTENUATION

RELATED APPLICATIONS

Priority is claimed from U.S. Provisional Patent Application No. 61/605,968 filed Mar. 2, 2012, entitled "Highly Nonlinear Fiber with Improved SBS Threshold and Moderate Attenuation", the teachings of which are incorporated by reference herein.

BACKGROUND OF THE INVENTION

1. Field of the Invention

The invention is directed to optical fiber. More specifically the invention is directed to highly nonlinear optical fiber (HNLF) and ways to reduce the threshold of stimulated Brillouin scattering (SBS) in HNLF.

2. Description of Related Art

Highly nonlinear optical fibers (HNLF), defined as fibers with an increased nonlinear coefficient ($\gamma$) and an engineered dispersion close to zero, have been used in numerous applications, including parametric amplification, phase sensitive amplifiers, optical regenerators, switching, and wavelength conversion. One of the limitations of conventional HNLF is stimulated Brillouin scattering (SBS). SBS is a phenomenon where, when light having power over a certain threshold is launched into an optical fiber, a part of the light is reflected and, therefore, the light cannot propagate through the fiber at high intensity. As a result, the intensity of the transmitted light is restricted (and the efficiency of the optical device is restricted), which sets an upper limit on the amount of power which can be launched into the HNLF. The SBS threshold power (Pth) determines the maximum obtainable nonlinear phase shift, which is given as:

$$\gamma L_{\mathit{eff}} P_{th} \quad (1)$$

where $P_{th}$ is the threshold power for the onset of SBS, $\gamma$ is the nonlinear coefficient, and $L_{\mathit{eff}}$ the effective length, given by:

$$\gamma = \frac{2\pi n_2}{\lambda A_{\mathit{eff}}} \quad (2)$$

$$L_{\mathit{eff}} = \frac{1 - \exp(-\alpha L)}{\alpha} \quad (3)$$

where $n_2$ is the nonlinear refractive index, $\lambda$ is the wavelength, $A_{\mathit{eff}}$ the effective area, $\alpha$ is the loss coefficient in units of $[m^{-1}]$, and L is the fiber length. Expression (1) is often referred to as the "figure of merit" for SBS-limited HNLFs. For conventional HNLFs having a germanium-doped silica core, the figure of merit is approximately 0.21, which is too low for some applications, such as phases sensitive amplifiers, and compression of the beat signal from two lasers closely spaced in wavelength and operating in continuous wave mode. It would be desirable to raise the SBS threshold for HNLFs.

Another way to increase the figure of merit $P_{th} \gamma L_{\mathit{eff}}$ is to increase the nonlinear coefficient $\gamma$ by making HNLFs from soft glass materials such as bismuth or lead silicate rather than silica. Quite high figure of merits, that is, FOMs greater than 1 have been demonstrated with soft glass based HNLFs. A drawback of such fibers is the quite high losses (approximately 1 dB/m) and the high coupling loss as compared to standard single mode fibers.

Two somewhat similar techniques for increasing the SBS threshold include applying a linear or stepwise temperature gradient, or a linear or stepwise strain gradient along the fiber. The principle in both techniques is that temperature or strain changes the SBS frequency shift. By applying a temperature/strain gradient along the fiber, the Brillouin line width is broadened and as a consequence the Brillouin gain coefficient $g_B$ is lowered. Increases in threshold of approximately 8 dB have been demonstrated in a HNLF using the temperature technique. Using the straining technique on HNLFs, threshold increases of 6-7 dB have been demonstrated. A drawback in both techniques is that both strain and temperature may also alter the dispersion. Both techniques have drawbacks from a practical point of view. Large strain will reduce the fiber lifetime. Unless very large diameter spools are used, straining will also increase the polarization mode dispersion (PMD) of the HNLF.

Another method to reduce the SBS in HNLF is to dope the core of the HNLF with aluminum instead of germanium. However, this method does not address the issue of attenuation, and a fiber having an effective area of 15 $\mu m^2$ or smaller requires additional undesired power requirements resulting from the high attenuation. Such methods tend to focus exclusively on the wt % doping level of aluminum in the core and fluorine in the trench region. However, there is no agreement in scientific literature as to the relationship between how much aluminum or fluorine is used and the respective changes that doping creates to the refractive indices of the thus-doped components. As an example, although there is theoretically a linear relationship between wt % amount of doped material and change to the refractive index of silica, literature values for the fluorine proportionality coefficient range from $-4 \times 10^{-3}/\%$ to $-8 \times 10^{-3}/\%$, and values for the aluminum proportionality coefficient range from $1.731 \times 10^{-3}/\%$ to $2.76 \times 10^{-3}/\%$. There are several possible reasons for such a large variation in the reported proportionality coefficient, including measurement uncertainty, dependence of the thermal history of the glass, and dependence of the amount of stress in the glass, among other possible reasons. Thus, one cannot properly rely on wt % levels estimated from index profile measurements.

Additional attempts to dope the core of an HNLF with aluminum instead of germanium thus far have resulted in quite high attenuation, which will limit the usable length and consequently increase the requisite pump power.

Accordingly, there is a long felt need to provide a HNLF that exhibits a higher SBS threshold than previously exhibited without evidencing attenuation problems.

SUMMARY OF THE INVENTION

The invention is a highly nonlinear optical fiber (HNLF) exhibiting improved SBS properties. In one embodiment, the HNLF includes a central core region made substantially from silica doped with aluminum, a trench region surrounding the central core region, and a silica cladding surrounding the trench region. The refractive index profile of the HNLF is optimized to raise the SBS threshold. A first refractive index difference of the central core region relative to the cladding ($\Delta n+$) is less than $26 \times 10^{-3}$, and a second refractive index difference of the trench region relative to the cladding ($\Delta n-$) is less than $-5 \times 10^{-3}$. Preferably, $\Delta n+$ is less than $26 \times 10^{-3}$ and greater than or equal to $16 \times 10^{-3}$, and more preferably $\Delta n+$ is approximately $21 \times 10^{-3}$. The trench region is preferably doped with fluorine, In addition, an outer diameter of the trench region is preferably approximately 3.8 times a diameter of the central core region. The fiber is preferably a single mode fiber. The invention further includes optical devices incorporating the above-described optical fiber. Such devices may include a phase sensitive amplifier, devices having two lasers operating in continuous wave mode and having a compressed beat signal owing to their wavelengths being closely spaced, and any other applications in which phase dithering or other conventional SBS suppression techniques cannot be utilized or are insufficient.

A HNLF is characterized by having a relative high nonlinear coefficient γ. In accordance with the invention, this is accomplished by optimizing the refractive index profile to minimize $A_{eff}$. Additionally, it is desired to have a dispersion (D) close to zero at the operating wavelength. The optimum value of D depends on the application. For most applications, D should be in the range −5 to +5 ps/(nm·km).

DETAILED DESCRIPTION OF THE INVENTION AND DRAWINGS

Description will now be given with reference to the attached FIGS. 1-3. It should be understood that these figures are exemplary in nature and in no way serve to limit the scope of the invention, which is defined by the claims appearing below.

Figure 1:
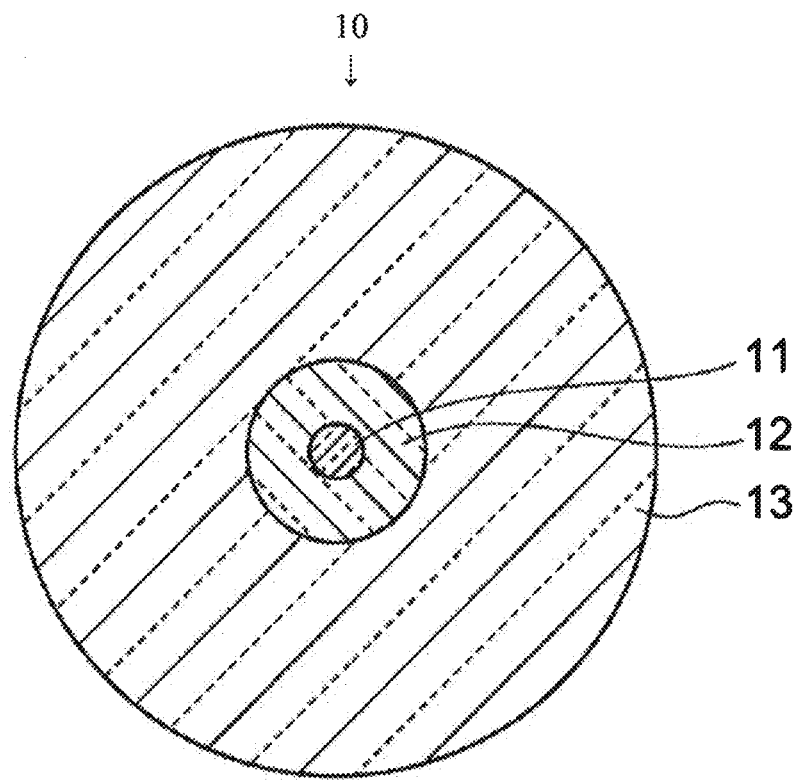
FIG. 1 is sectional schematic of a HNLF in accordance with the invention.
Figure 2:
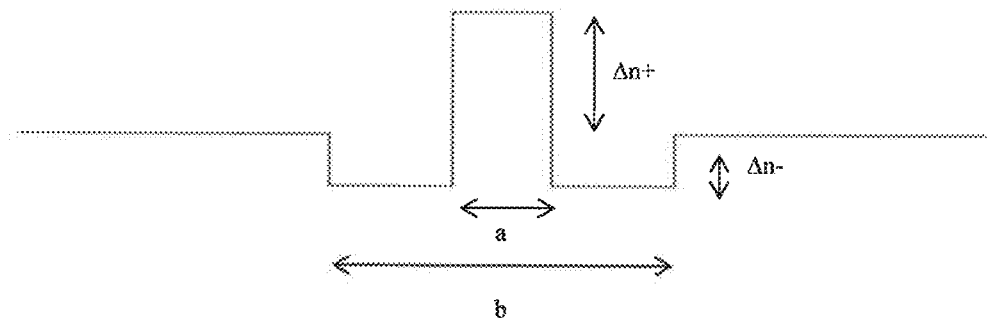
FIG. 2 is a schematic of a refractive index profile for a HNLF in accordance with the invention.
Figure 3:
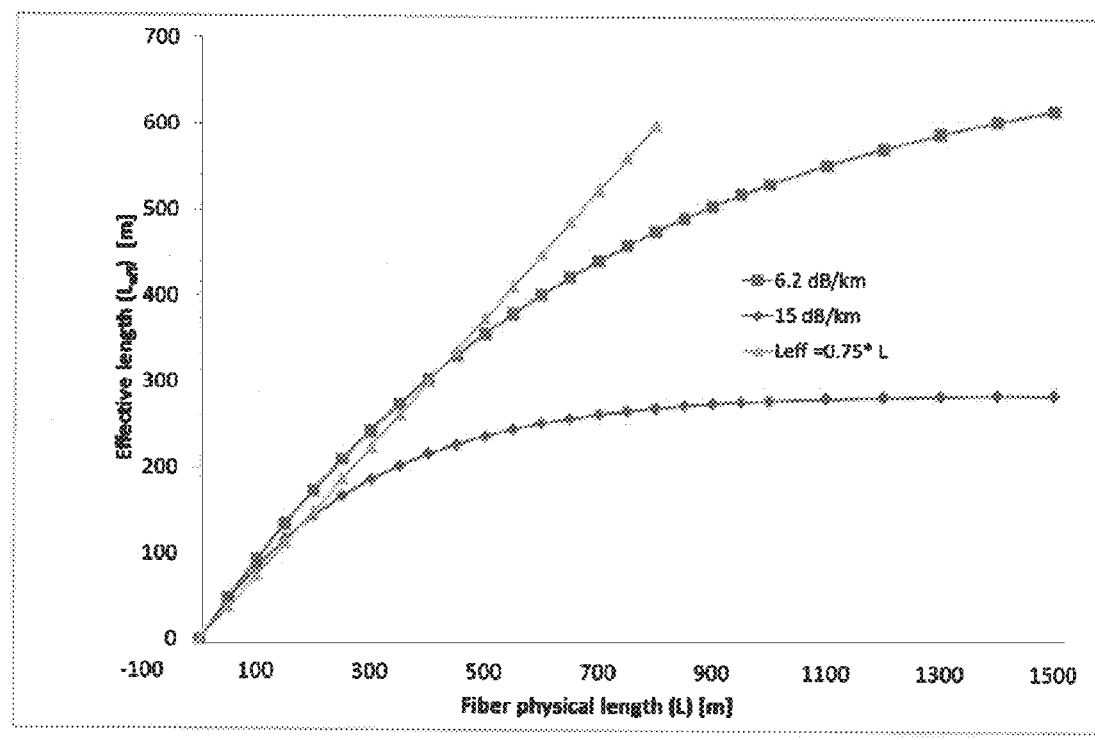
FIG. 3 is a graph illustrating effective length $L_{eff}$ as a function of fiber length.

FIG. 1 is a cross-sectional view of an optical fiber 10 according to an embodiment of the present invention, and FIG. 2 is a schematic view showing a refractive index profile of the optical fiber 10. The optical fiber 10 comprises a central core 11, a trench region 12 surrounding the central core 11, and a cladding 13 surrounding the trench region 12. The refractive index of the cladding 13 is lower than that of the central core 11 and is greater than that of the trench region 12. Core 11 has a diameter, a, and a refractive index difference relative to the outer cladding of Δn+. Core 11 is preferably made from silica doped by aluminum in a preferred amount to increase the refractive index. Trench region 12 has a diameter, b, and a refractive index difference relative to the outer cladding of Δn−. Trench region 12 is preferably made out of silica doped with fluorine. Cladding 13 is preferably also made from silica.

The purpose of trench region 12 can be thought of as two-fold. First, for designs having a dispersion, D, of approximately zero, the trench region decreases $A_{eff}$; the lower or more negative the value for Δn−, the lower the $A_{eff}$. Second, by optimizing the diametric ratio of b/a, the dispersion slope can be minimized and D is approximately zero. Low dispersion slope is good for parametric amplifier applications as it increases the gain bandwidth. Yet, a low dispersion slope also increases variation in dispersion, which then decreases the gain bandwidth of parametric amplifiers. Therefore, in the preferred embodiment, a large diametric ratio, b/a, is selected, which also will minimize $A_{eff}$. In this example, Δn− is approximately −10×10−3, which is the lowest that can be obtained with a Modified Chemical Vapor Deposition (MCVD) technique. The ratio of b/a has been selected to be approximately 3.8, beyond which any additional benefits in terms of minimizing $A_{eff}$ become minimal. Regarding the core, for fixed values of Δn+, Δn−, and b/a, diameter a is optimized to get D approximately to 0. Thus, the higher Δn+, the lower the effective area $A_{eff}$. It is possible to achieve greater Δn− using other techniques, such as Plasma Enhanced Chemical Vapor Deposition (PCVD).

An embodiment of HNLF created by the present inventors included an Al-doped HNLF with an attenuation of 15 dB/km. That fiber had Δn+ of approximately 26×10−3, equivalent to an Al doping level of 14 wt %. In the inventive fiber, to achieve lower loss, the Al concentration in the new Al-doped HNLF was decreased from 14 wt to around 11 wt % (Δn+ of approximately 21×10−3). This decreases the nonlinear coefficient γ somewhat, but does not significantly decrease the figure of merit for SBS-limited HNLF. Herein, a proportionality coefficient for aluminum doping of 1.84×10−3/% is assumed for comparison purposes. To that end, in the preferred embodiment of the invention, the aluminum doping level of the central core region is preferably less than 14 wt % Al, and more preferably approximately 11 wt % Al.

Table 1 below shows measured properties for the new, inventive Al-doped fiber compared with a prior Al-doped HNLF and a conventional Ge-doped HNLF:

TABLE 1

| Property | Unit | Ge-doped HNLF | Previous Al-doped HNLF | New Al-doped HNLF |
|---|---|---|---|---|
| Δn+ | | 30·10−3 | 26·10−3 | 21·10−3 |
| Al doping level | Wt % | 0 | 14 | 11 |
| Attenuation | dB/km | 0.83 | 15 | 6.2 |
| PMD | ps·km−0.5 | 0.05 | 0.1 | 0.3 |
| Dispersion slope | ps/(nm²·km) | 0.018 | 0.011 | 0.024 |
| Zero dispersion wavelength | nm | | 1560 | 1558 |
| Mode field diameter | μm | | 4.25 | 4.50 |
| Effective area | μm² | 11.5 | 13.5 | 15.2 |
| γ | (W·km)−1 | 11.6 | 7.4 | 6.9 |
| n₂ | m²/W | 3.3·10−20 | 2.5·10−20 | 2.6·10−20 |
| $P_{th} \cdot L_{eff}$ | W·m | 18.3 | 85 | 88 |
| $P_{th} \cdot \gamma \cdot L_{eff}$ | | 0.21 | 0.63 | 0.61 |

In the conventional Ge-doped fiber, attenuation is favorably very low, however the figure of merit $P_{th}\gamma L_{eff}$ is too low for some applications, such as phase sensitive amplifiers or applications having compression of the beat signal from two lasers closely spaced in wavelength and operating in continuous wave mode. In the previous Al-doped fiber, the figure of merit $P_{th}\gamma L_{eff}$ is significantly higher (triple) than that of the Ge-doped fiber, however attenuation is extremely high. Even though the new Al-doped HNLF has a higher $A_{eff}$ and, consequently, a lower γ than the previous Al-doped HNLF, the overall figure of merit $P_{th}\gamma L_{eff}$ is not much lower. Importantly, however, the attenuation is significantly decreased from 15 dB/km to 6.2 dB/km with the inventive Al-doped HNLF. With the lower loss, the effective length of the inventive fiber can be significantly increased. This is illustrated in FIG. 3 where $L_{eff}$ is shown as function of L.

For practical use, $L_{eff}$ should not be too much lower than the fiber length, L. From FIG. 3 it can be seen that, if the criteria $L_{eff}$ greater than or equal to 0.75×L is used, then a maximum $L_{eff}$ for the prior art Al-HNLF was 130 m while it is 320 m for the inventive Al-HNLF. This means that the pump power requirement for the same nonlinearity will be (320×6.9)/(130×7.4)=2.3 times lower for the new Al-HNLF compared to the old.

Embodiments of the present invention include a single mode optical fiber comprising a central core, which is made of SiO2 as the main component doped with Al with a weight concentration of 6 wt % or more so that Δn+ is approximately 21×10−3, having an absolute value of dispersion of 5 ps/(nm·km) or less at 1550 nm, and having an effective area in the range of 15 to 20 µm2 at 1550 nm. Further aspects of these embodiments include a nonlinear figure of merit of greater than 0.3 for SBS-limited HNLF $P_{th}\gamma L_{eff}$ at 1550 nm; an attenuation at 1550 nm of less than 15 dB/km; and an increased SBS threshold by applying a linear stepwise temperature gradient along the length of the fiber, or a linear stepwise strain gradient. Other embodiments include optical fiber devices using the inventive fiber and methods of operating such devices.

As previously noted, the invention is well-suited for phase sensitive amplifiers or applications having compression of the beat signal from two lasers closely spaced in wavelength and operating in continuous wave mode. More generally, the invention is well-suited for application of parametric amplifiers used for phase encoded signals and/or all applications where phase dithering or other alternative SBS suppression techniques cannot be utilized or are otherwise insufficient.

Having described certain embodiments of the invention, it should be understood that the invention is not limited to the above description or the attached exemplary drawings. Rather, the scope of the invention is defined by the claims appearing below and includes any equivalents thereof as would be appreciated by one of ordinary skill in the art.

What is claimed is:

1. A highly nonlinear optical fiber, comprising:
    a central core region made substantially from silica doped with aluminum;
    a trench region substantially surrounding said central core region; and
    a silica cladding substantially surrounding said trench region,
    wherein a first refractive index difference of said central core region relative to said cladding ($\Delta n+$) is $<26\times10^{-3}$,
    wherein a second refractive index difference of said trench region relative to said cladding ($\Delta n-$) is $<-5\times10^{-3}$, and
    wherein attenuation in said fiber at 1550 nm is below 10 dB/km and the figure of merit $P_{th}\gamma L_{eff}$ is above 0.40.

2. A highly nonlinear optical fiber according to claim 1, wherein said fiber is a single mode fiber.

3. A highly nonlinear optical fiber according to claim 1, wherein said $\Delta n+$ is $<26\times10^{-3}$ and $>16\times10^{-3}$.

4. A highly nonlinear optical fiber according to claim 1, wherein said $\Delta n+$ is approximately 21×10−3.

5. A highly nonlinear optical fiber according to claim 1, wherein said trench region is doped with fluorine.

6. A highly nonlinear optical fiber according to claim 1, wherein an aluminum doping level of said central core region is <14 wt % Al.

7. A highly nonlinear optical fiber according to claim 1, wherein a first outer diameter of said trench region is approximately 3.8 times a second diameter of said central core region.

8. An optical device, comprising:
    a highly nonlinear optical fiber, said fiber including:
        a central core region made substantially from silica doped with aluminum;
        a trench region substantially surrounding said central core region; and
        a silica cladding substantially surrounding said trench region,
    wherein a first refractive index difference of said central core region relative to said cladding ($\Delta n+$) is $<26\times10^{-3}$, and
    wherein a second refractive index difference of said trench region relative to said cladding ($\Delta n-$) is $<-5\times10^{-3}$, and
    wherein attenuation in said fiber at 1550 nm is below 10 dB/km and the figure of merit $P_{th}\gamma L_{eff}$ is above 0.40.

9. An optical device according to claim 8, wherein said fiber is a single mode fiber.

10. An optical device according to claim 8, wherein said $\Delta n+$ is $<26\times10^{-3}$ and $>16\times10^{-3}$.

11. An optical device according to claim 8, wherein said $\Delta n+$ is approximately $21\times10^{-3}$.

12. An optical device according to claim 8, wherein said trench region is doped with fluorine.

13. An optical device according to claim 8, wherein an aluminum doping level of said central core region is <14 wt % Al.

14. An optical device according to claim 8, wherein a first outer diameter of said trench region is approximately 3.8 times a second diameter of said central core region.

15. An optical device according to claim 8, wherein said device includes a phase sensitive amplifier.

16. An optical device according to claim 8, wherein said device further comprises:
    a first laser having a first wavelength operating in a continuous wave mode; and
    a second laser having a second wavelength sufficiently close to said first wavelength so as to form a beat signal, said beat signal being compressed.

* * * * *